United States Patent

[11] 3,625,189

[72] Inventors Phillip S. Myers
3210 Oxford Drive, Madison, Wis. 53705;
Otto A. Uyehara, 1610 Waunona Way,
Madison, Wis. 53713
[21] Appl. No. 7,641
[22] Filed Feb. 2, 1970
[45] Patented Dec. 7, 1971
Continuation-in-part of application Ser. No. 615,145, Feb. 10, 1967, now Patent No. 3,494,336, Continuation-in-part of application Ser. No. 835,134, June 20, 1969, now Patent No. 3,507,261. This application Feb. 2, 1970, Ser. No. 7,641

[54] METHOD AND APPARATUS FOR REDUCING EXHAUST EMISSIONS AND IMPROVING FUEL UTILIZATION IN INTERNAL COMBUSTION ENGINES
2 Claims, 14 Drawing Figs.
[52] U.S. Cl. .................................................. 123/32 ST, 123/119 A
[51] Int. Cl. ............................................... F02b 17/00
[50] Field of Search .......................................... 123/32, 32 ST, 32 SP, 65, 119 A

[56] References Cited
UNITED STATES PATENTS
3,113,561 12/1963 Heintz .......................... 123/65
Primary Examiner—Laurence M. Goodridge
Attorneys—Joseph G. Werner, Theodore J. Long, John M. Winter and James A. Kemmeter ABSTRACT: Method and apparatus for providing a stratified charge of two constituents in the combustion chamber of an internal combustion engine when the engine is operated at less than full load to reduce all three undesirable exhaust emissions, i.e., hydrocarbons, carbon monoxide and oxides of nitrogen. One constituent of the stratified charge comprises exhaust gas, mixed with air if desired; and the other a fuel/air mixture, having exhaust gases mixed therewith if desired, to produce reduced quantities of oxides of nitrogen. The exhaust gas portion of the exhaust gas/air mixture provided in the combustion chamber at all partial engine loads is selected from that portion of the exhaust gases which was formed by the burning of the fuel/air mixture constituent of a previous stratified charge. At relatively heavy engine loads, when all of the exhaust gases formed by the burning of the fuel/air mixture constituent of a previous stratified charge cannot be recycled, a secondary selection is made to recycle either the bulk gases thereof (high in carbon monoxide) or the quench gases thereof (high in hydrocarbons) or all of one and as much of the other as possible.
The relative amounts of the fuel/air mixture and exhaust gas/air mixture making up the stratified charge may be varied in response to accelerator position by auxiliary intake and exhaust timing valves which are actuated by variable timing control mechanism, with a maximum quantity of fuel/air mixture and a minimum quantity of exhaust gas/air mixture being introduced for full engine load, and vice versa for minimum load. During deceleration the fuel/air mixture intake can be completely cut off until engine idling speed is reached when, of course, a sufficient fuel/air mixture is again supplied to keep the engine running.

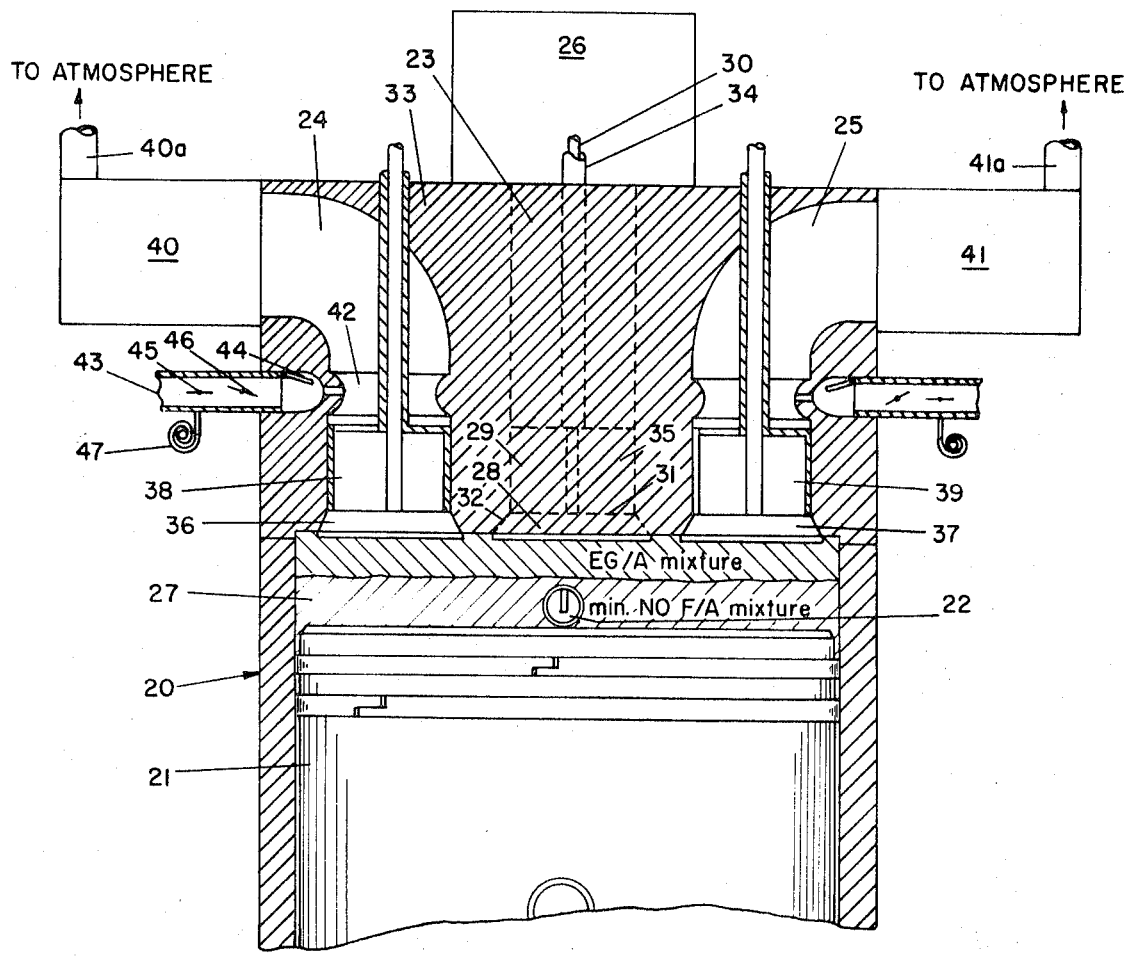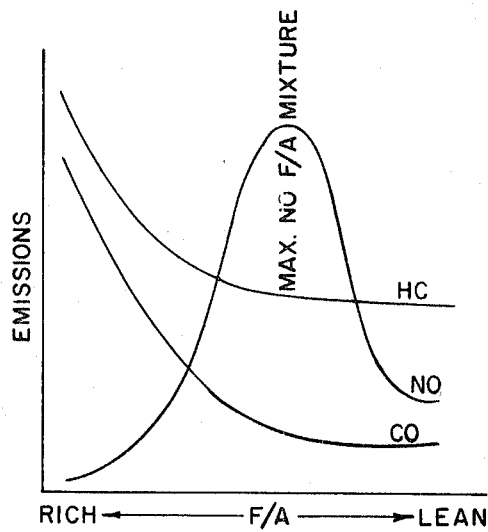

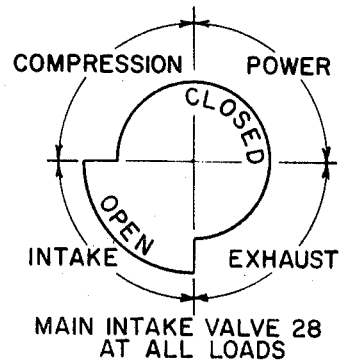

METHOD AND APPARATUS FOR REDUCING EXHAUST EMISSIONS AND IMPROVING FUEL UTILIZATION IN INTERNAL COMBUSTION ENGINES

CROSS REFERENCE TO RELATED APPLICATIONS

This application is a continuation-in-part of our copending U.S. Pat. applications, Ser. No. 615,145, filed Feb. 10, 1967 now U.S. Pat. No. 3,494,336, and Ser. No. 835,134 now U.S. Pat. No. 3,507,261, filed June 20, 1969.

BACKGROUND OF THE INVENTION

Our invention relates to internal combustion engines and more specifically to a method and apparatus for reducing exhaust emissions from internal combustion engines and improving the fuel utilization of such engines, particularly when operating at less than full load.

In recent years low exhaust emissions have become a controlling criteria for internal combustion engine design. The exhaust from such engines consists of fully oxidized products of combustion, carbon dioxide, and water vapor, plus partially oxidized, cracked and other hydrocarbons (this group of hydrocarbons herein referred to simply as hydrocarbons), carbon monoxide, oxides of nitrogen, and traces of miscellaneous pollutants. At the present time the fully oxidized products, carbon dioxide, and water vapor are considered inevitable and are not therefore considered undesirable, but the hydrocarbons, carbon monoxide, and oxides of nitrogen, which, with the addition of sunlight, form the constituents of smog, are considered highly undesirable. Legislation setting increasingly restrictive standards for these undesirable emissions has already been passed and it seems inevitable and proper that subsequent legislation will prescribe even lower permissible concentrations for same.

In understanding the prior art and its relationship to the method and apparatus described in this application for patent for reducing undesirable exhaust emissions from spark-ignition internal combustion engines, it will be helpful to first understand where and how these undesirable products are formed.

In regard to the hydrocarbons, it is generally recognized that in spark-ignition engines, the flame originates at the spark plug and spreads outwardly toward the combustion chamber walls, i.e., the head, valves, piston, and cylinder wall. At the completion of burning there is a generally cylindrical "quench zone" adjacent to the walls of the combustion chamber wherein because of the cooling and other effects of the combustion chamber walls, the flame is unable to propagate any further. Since the flame does not completely penetrate this quench zone but the gases in the quench zone have been heated by the adjacent flame, it is believed that a portion of the fuel in the quench zone is only partially oxidized and/or cracked.

In a stratified charge engine such as is proposed herein somewhat of a quench zone may also exist at the interface between the constituents of the stratified charge. It follows that if one constituent of the stratified charge is exhaust gases or a mixture of exhaust gases and a small amount of air, the existence of a flame front is questionable even though some oxidation may take place due to the small amount of hydrocarbons in the exhaust gases. Furthermore, if a quench zone does exist in the exhaust gas/air mixture it will contain only minute amounts of hydrocarbons.

Because of the generally cylindrical configuration of the quench zone in a conventional spark-ignition engine, when the exhaust valve opens the gases in the quench layer next to the valve are expelled first from the cylinder during the exhaust stroke. The subsequent gases (generally referred to as "bulk gases") to be expelled come from the center portion of the combustion chamber where the flame has traversed and have virtually no or very few hydrocarbons. However, when the piston moves up on the exhaust stroke it scrapes the quench layer off the cylinder walls, and, thus, the last portion of the exhaust gases to be expelled comes from the quench zone and is also rich in hydrocarbons.

In the exhaust port and manifold, mixing of the relatively hot bulk gases and the cooler quench gases occurs and results in further oxidation of the remaining fuel and hydrocarbons. However, unless additional air is added or the engine is operated with a lean fuel/air mixture there is only a very limited amount of oxygen available to support this second stage oxidation. Furthermore, there is a rapid decrease in rates of chemical reactions with a decrease in temperature. Thus, the lack of oxygen and/or cooling in the exhaust port and manifold soon slows down oxidation of the hydrocarbons to a negligibly small rate.

It is known that the thickness of the quench zone depends upon the fuel/air ratio in the combustion chamber. In addition, when fuel/air mixtures with excess air (lean mixtures) are burned, increased oxygen is available during the exhaust process for oxidation of hydrocarbons. Thus, experimentally it is observed that the maximum amount of hydrocarbons is present in the exhaust when burning rich fuel/air mixtures. The remaining fuel and hydrocarbons present in the exhaust emissions decrease as the fuel/air mixture approaches the chemically correct proportions and remains relatively constant as the mixture is made leaner until the misfire limit is approached when they again increase.

The prior art attempts to reduce the hydrocarbon content of the exhaust gases teach the following:

a. Leaner operation. As will be described more fully hereinafter, this first results in increased concentrations of oxides of nitrogen, although eventually, if extremely lean mixtures are used oxides of nitrogen are decreased.

b. Increased exhaust temperatures by retarded spark or combustion chamber design. This approach generally means operating the engine in a less efficient manner.

c. Increased exhaust temperature by means of exhaust port and manifold insulation. However, the insulation increases the temperature of the manifold material, which either causes unreasonably short manifold life or requires the use of exotic, expensive materials. In addition, misfires may cause momentarily large increases in temperatures.

d. Addition of small amounts of air to the hot exhaust gases in the exhaust port or manifold to provide excess oxygen. Providing precisely the correct amount of air under all operating conditions has proved to be very difficult. Too much air provides too much cooling, which causes the reaction rate to approach zero. On the other hand, too little air provides too little oxygen to support the oxidation. In addition, adequate mixing of the added air and exhaust gases is difficult and residence time in the hot manifold is limited.

e. Catalytic mufflers. The catalyst provides higher reaction rates at lower temperatures but is subject to fouling and overheating on misfire.

f. After burners. The exhaust gases with additional air added thereto can be reheated by an open flame at the expense of added fuel consumption plus the difficulties of providing the proper energy input to the flame under wide variations in operating conditions.

g. Minimizing quench area in the combustion chamber. The use of a stratified charge reduces the wall quench area but may provide another quench area at the interface of the two constituents. Thus, while such stratified charge engines have accomplished some reduction in hydrocarbons, there is a limit to the reduction that can be accomplished and they have not reduced the emission of oxides of nitrogen.

While carbon monoxide (hereinafter referred to as CO) is formed to some extent in the quench gases, CO is also formed in the combustion process. Because of the slowness of some reactions during the expansion process where the temperature is decreasing, CO is present in the bulk gases in considerably larger than equilibrium quantities. All of the above-listed prior art techniques for obtaining a reduction in hydrocarbons, except the last, (g), will also decrease the concentration of CO, however, the problems noted are present.

Oxides of nitrogen (hereinafter referred to as NO) are also formed in the bulk gases and during expansion remain at concentrations close to those formed at the peak temperature experienced by the gases. This is due to the very slow rate of the destruction reactions for NO. However, as is apparent from the well known NO-fuel/air ratio curve shown in FIG. 2, NO is affected by changes in fuel/air ratio in an almost inverse manner to the way in which hydrocarbons and CO are affected. Thus, NO concentrations which are low when burning richer than stoichiometrically correct fuel/air mixtures, increase to a maximum at a mixture somewhat leaner than the stoichiometrically correct mixture, and then decrease again when the mixture reaches a still leaner range. Thus, the engine designer is caught in a dilemma—the burning of a rich fuel/air mixture produces high hydrocarbon and CO concentrations but low NO concentrations, while the reverse is true for moderately lean mixtures. The burning of very lean mixtures may produce relatively low concentrations of both CO and NO but results in ignition problems and low flame speeds and consequently erratic engine operation which makes the use of very lean mixtures somewhat less desirable than rich mixtures at this time.

It is recognized that any process that lowers the peak gas temperature without increasing the oxygen supply will decrease NO concentration. Thus, in the past it has been proposed to introduce exhaust gases into the intake system to serve as a diluent and lower the peak gas temperature. Water has also been suggested for the same purpose. However, any diluent decreases power output. In addition, the recirculation of exhaust gases through the intake system causes undesirable deposits in the intake manifold as well as forming deleterious compounds in the lubricating oil and reduces the range of "smooth" operation. A muffler with a suitable catalyst can reduce the NO but is subject to fouling and overheating. No satisfactory way of eliminating NO emissions is known.

The preceding discussion has assumed steady operation of the engine. In practice, particularly in heavy traffic where emissions are particularly undesirable, the load on the engine varies rapidly. Under these conditions emissions are affected as follows:

1. Emissions are a function of fuel/air ratio as previously described for steady-state operation.

2. During deceleration when high intake manifold vacuums are experienced, there is sufficient dilution of the fuel/air mixture with products of combustion that misfiring occurs with obvious effects on emissions.

3. During rapid acceleration, because the intake manifold pressure is going from a low to a high pressure, it has been found necessary to momentarily introduce additional fuel in order to obtain smooth engine operation. This is done automatically when the accelerator is rapidly depressed. This additional fuel, while necessary for smooth operation, obviously increases hydrocarbon emissions.

In addition, during cold starting and warmup of an engine, it is necessary to provide a very rich liquid-fuel/air ratio in order to obtain a combustible vapor-fuel/air ratio. Thus, during cold starting and warmup of an engine, hydrocarbon emissions are increased.

Referring to other attempts to produce a stratified charge, Greuter, U.S. Pat. No. 338,399 (1906), teaches stratification of air and fuel/air mixture in an internal combustion engine for economy but does not retain or bring back the exhaust products and consequently does not obtain the low emissions we have described.

West, U.S. Pat. No. 1,494,763 (1924), teaches the use of a stratified charge of an exhaust gas/air mixture and a fuel/air mixture but fails to recognize first that such a procedure has the potential of reducing emissions. However, West does not suggest that if all three undesirable exhaust emittants, namely, hydrocarbons, CO and NO, are to be minimized, the incoming fuel/air mixture must be measurably richer or lesser than that mixture which would produce maximum NO. Moreover, West does not suggest any quality selection of the exhaust gases to be recycled. West likewise does not teach that the portion of air in the exhaust gas/air mixture which is provided in the cylinder shall be regulated so as to provide sufficient oxygen to complete combustion without excessive cooling which would result in a reduction in reaction rates.

Burnett, U.S. Pat. No. 1,481,955 (1924), likewise teaches stratification of the exhaust gas/air mixture with the fuel/air mixture but fails not only to recognize the same things as West, but also provides for cooling the exhaust gases before readmitting them to the cylinder. As previously explained minimum heat loss is desired in order to maintain high chemical reaction rates during the recompression of the recirculated exhaust gases.

There are many patents that teach retainment or reintroduction of exhaust gases or exhaust gas/air mixture without stratification with a fuel/air mixture in the combustion chamber. While this will reduce the amount of NO formed, it will not materially reduce the amounts of hydrocarbons and CO exhausted. In fact this procedure may increase the hydrocarbons emitted since experience show that for smooth operation the relatively homogeneous mixture of exhaust gases and fuel and air must be richer than if fuel and air alone were burned. Thus, if apparatus were constructed in accordance with the prior art teachings no significant reduction in all emissions would result. At best, either the CO and hydrocarbon pollutants or the NO pollutant, but not all three, would be minimized.

It is clear that a successful method for reducing exhaust emissions must be able to reduce all three undesirable constituents (hydrocarbons, CO, and NO) and to the best of our knowledge no successful method for adequately reducing all three is known.

SUMMARY OF THE INVENTION

Basically, our invention comprises a method and apparatus for markedly reducing all three undesirable exhaust gas constituents, namely, hydrocarbons, CO and NO, by producing in the combustion chamber of an internal combustion engine a stratified charge; one portion of which consists of exhaust gas, mixed with air if desired, (hereinafter referred to as exhaust gas/air mixture or EG/A mixture) and the second portion consisting of a fuel and air mixture controlled to give reduced NO emissions. These reduced NO emissions can be achieved in either of two ways. First, the fuel/air mixture can be controlled to be measurably richer or leaner than that fuel and air mixture which would produce maximum NO. The fuel/air mixture which would produce maximum NO will hereinafter be referred to as "maximum NO fuel/air mixture" or "max NO F/A mixture." Second, small amounts of exhaust gas can be homogeneously mixed with the fuel/air mixture (including the max NO F/A mixture), thus lowering peak gas temperatures and reducing the production of NO.

The mixture which produces the desired reduced NO emissions, whether it be achieved by controlling the fuel/air ratio to be measurably richer or leaner than max NO F/A mixture or by mixing exhaust gases with the fuel and air, it will hereinafter be referred to as "minimum NO fuel/air mixture" or "min NO F/A mixture." It, of course, is understood that said min NO F/A mixture must be leaner than the rich flammability limit for the fuel and richer than the lean flammability limit.

By burning this min NO F/A mixture, substantially less NO will be produced than would be produced by the max NO F/A mixture. The preferred operation will be on the rich side of the NO curve because experience has shown that smoother engine operation is realized using the rich min NO F/A mixture rather than the lean min NO F/A mixture.

The combustion of the min NO fuel/air mixture will result in reduced formation of NO but hydrocarbons and CO will be formed as shown by the general curves in FIG. 2. However, in accordance with our invention, the exhaust gases are expelled from the combustion chamber, and a selected portion of these exhaust gases is mixed with a controlled amount of air, and then reintroduced to the cylinder to form the EG/A mixture constituent of the charge for the next cycle. The EG/A mixture is then recompressed during the subsequent cycle by the piston and by the exploding min NO F/A mixture constituent of the stratified charge.

It is an important feature of our invention that the exhaust gases returned to the cylinder at all partial engine loads be selected from that portion of the exhaust gases which was formed by the burning of the min NO F/A mixture constituent of a previous stratified charge because it is higher in pollutant content than that portion of the exhaust gases which is formed from the burning of the EG/A mixture constituent of the charge. This primary selection prevents the retreatment of the same portion of exhaust gases over and over and therefore maximizes the reduction of pollutants. At relatively heavy partial engine loads, when all of the exhaust gases formed by the burning of the min NO F/A mixture constituent of a previous stratified charge can not be recycled, an additional or secondary selection is made through timing of the valves to recycle either the bulk gases thereof which are relatively high in CO, or the quench gases thereof which are relatively high in hydrocarbons, or all of one and as much of the other as is possible.

Our method and apparatus for selectively exhausting and redrawing exhaust gases can be employed for any F/A mixture used; however, to facilitate the clear understanding of the preferred form of the invention, all further discussion will refer to the use of what we have previously defined as min NO F/A mixture.

As a result of recompression or recompressions of the EG/A mixture constituent of the stratified charge, its temperature and pressure will be increased and because of the approximately logarithmic relationship between temperature and chemical reaction rates, its chemical reaction rate will be markedly increased over that present in the exhaust manifold. Because of the increased reaction rate and the addition of a sufficient quantity of air to complete oxidation, the hydrocarbons and CO are fully oxidized in the cylinder during such recompression or recompressions. Thus, the exhaust gas that has been recompressed and finally expelled will have little or no NO because it resulted from originally burning of the min NO F/A mixture, and will now have little or no hydrocarbons and CO because they were destroyed during subsequent recompression or recompressions in the presence of added air and the consequent increased pressures, temperatures and reaction rates.

Thus, if the EG/A mixture that has been recompressed is selectively exhausted, the gases finally going out the exhaust pipe will be completely, or nearly completely, free of all three undesirable emissions, particularly when the engine is running at light or partial load. At full load, little or no reduction of exhaust emissions is achieved, but this is not a serious detriment since full load operation of automotive engines is very infrequent while partial or light load operation is, of course, very common.

The relative amounts of the two constituents of the stratified charge, EG/A mixture and min NO F/ mixture, are varied in response to accelerator position in the preferred embodiment by auxiliary intake and exhaust valves actuated by a variable timing control mechanism. The maximum quantity of min NO F/A mixture and minimum quantity of EG/A mixture is introduced for full engine load, and vice versa for minimum load at idle, while during deceleration the min NO F/A mixture can be cut off completely.

The amount of air mixed with the exhaust gas may be controlled both by a valve assembly responsive to engine temperature and by a valve assembly controlled by accelerator position. The amount of air mixed with the exhaust gases redrawn into the combustion chamber must be sufficient to complete oxidation of the exhaust gases on recompression but less than will excessively cool the resulting EG/A mixture and thus reduce the reaction rate. The fact the EG/A mixture is recompressed causing increased temperatures permits much more leeway in the amount of air introduced than when air is merely introduced into the exhaust manifold as in the prior art.

Other objects, features and advantages of our invention will be apparent from the following detailed description taken in conjunction with the accompanying drawings wherein several embodiments illustrating the principles of our invention have been selected for exemplification.

BRIEF DESCRIPTION OF THE DRAWINGS

FIG. 1 is a schematic sectional view of a cylinder of a four-cycle internal combustion engine in accordance with our invention showing a compressed stratified charge therein about to be ignited in the stratum of min NO F/A mixture. The drawing is simplified to illustrate the theory and functioning of our invention and clearly is not intended to depict all of the components of an internal combustion engine. Only those parts which are necessary for the understanding of our improved method and apparatus have been included.

FIG. 2 is a general diagram of NO, hydrocarbon and CO versus fuel/air ratio curves.

FIG. 3 is a diagram showing the timing of the main intake valve of the cylinder shown in FIG. 1.

FIG. 4 is a diagram showing the timing of the auxiliary intake timing valve of the cylinder shown in FIG. 1 at full engine load.

FIG. 5 is a diagram showing the timing of the auxiliary intake timing valve of the cylinder shown in FIG. 1 at a relatively heavy partial engine load.

FIG. 6 is a diagram showing the timing of the auxiliary intake timing valve of the cylinder shown in FIG. 1 at a relatively light partial engine load.

FIG. 7 is a diagram showing the timing of the pair of main exhaust valves of the cylinder shown in FIG. 1.

FIG. 8 is a diagram showing the timing of the pair of auxiliary exhaust timing valves of the cylinder shown in FIG. 1 at full engine load.

FIGS. 9 and 10 are diagrams showing a timing of the auxiliary exhaust timing valves of the cylinder shown in FIG. 1 when the engine is operating at such a load level that all of the exhaust gases formed from the combustion of the min NO F/A mixture constituent of a previous charge is recycled.

FIGS. 11 and 12 are diagrams showing a timing of the auxiliary exhaust timing valves of the cylinder shown in FIG. 1 for recycling the bulk gas portion of the exhaust gases formed from the combustion of the min NO F/A mixture constituent of a previous stratified charge.

FIGS. 13 and 14 are diagrams showing a timing of the auxiliary exhaust timing valves of the cylinder shown in FIG. 1 for recycling the quench gas portion of the exhaust gases formed from the combustion of the min NO F/A mixture constituent of a previous stratified charge.

DESCRIPTION OF PREFERRED FORMS OF THE INVENTION

Referring now more particularly to the drawings, wherein like numerals refer to like parts throughout the several views, in FIG. 1, reference numeral 20 represents the cylinder of a four-cycle, spark-ignition, internal combustion engine with a piston 21 shown therein at the top of its compression stroke. A spark plug 22 is positioned in the sidewall of the cylinder so as to ignite the stratified charge in the min NO F/A mixture stratum adjacent the piston and below the EG/A mixture stratum which is adjacent the intake port 23 and the twin exhaust ports 24 and 25.

The desired min NO F/A mixture can be formed in a conventional carburetor shown schematically at 26 for introduction into the combustion chamber 27 of the cylinder through the intake port. As mentioned hereinbefore, the preferred mixture will be a min NO F/A mixture on the rich side of the NO curve shown in FIG. 2 rather than the lean side because smoother engine operation can be obtained. The rich min NO F/A mixture will, of course, be leaner than the rich flammability limit for the particular fuel, but rich enough to produce not more than a tolerable level of NO. While the burning of this rich min NO F/A mixture will result in the formation of hydrocarbons and CO, these pollutants will be substantially reduced by recycling all or part of the quench gases and bulk gases selected from that portion of the products of combustion which was formed by the burning of the rich min NO F/A mixture constituent of a previous stratified charge.

The intake port 23 is controlled by an intake valve assembly comprising a main intake valve 28 and a variably timed auxiliary intake valve 29. The main intake valve 28 of the intake valve assembly has a stem 30 and a circular head 31 adapted to seal against a valve seat 32 formed in the cylinder head 33. The auxiliary intake timing valve 29 has a tubular stem portion 34 and an open-ended tubular or cylindrical head 35. The stem 30 is slideably received in and extends through the tubular stem portion 34 and head 35 of the auxiliary intake valve. This valve assembly is the same as that described more particularly in our pending U.S. Pat. application Ser. No. 615,145.

The exhaust ports 24 and 25 are controlled by exhaust valve assemblies comprising main exhaust valves 36 and 37 and variably timed auxiliary exhaust valves 38 and 39. These exhaust valve assemblies are of the same construction as the intake valve assembly.

Since the auxiliary timing valves 29, 38 and 39 and their respective associated main valves 28, 36 and 37 are disposed in series (the main valves being positioned between the combustion chamber and the auxiliary timing valves) the sealing requirements of the auxiliary timing valves are minimal and the pressure differentials they must withstand are small. Accordingly, they can be very light in construction to permit easy variation in timing as required. Furthermore, the auxiliary timing valves do not require special valve seats since their primary function is timing rather than sealing and a close clearance between the open-ended tubular heads of these valves and the wall of the intake and exhaust ports in which they reciprocate provide a sufficient seal.

As mentioned hereinbefore, a regulated amount of air should be mixed with the exhaust gas prior to redrawing the exhaust gas into the combustion chamber for recompression. The quantity of air introduced is controlled so as to provide a sufficient amount to complete oxidation of the exhaust gases being recycled, but less than that which would excessively cool the resulting EG/A mixture and thus result in an excessive reduction of the reaction rate.

In the embodiment illustrated in FIG. 1, the air is automatically introduced and mixed with the exhaust gases both as these gases are expelled from and redrawn into the combustion chamber. The exhaust gases expelled from the combustion chamber through exhaust ports 24 and 25 pass into exhaust chambers 40 and 41. A portion of the exhaust gases may then be redrawn through one or both of the exhaust ports into the combustion chamber for recompression while the rest of the exhaust gases are exhausted to the atmosphere through the exhaust system 40a and 41a.

It is understood that in a multiple cylinder engine chambers 40 and 41 can be common to more than one cylinder.

The introduction of air into the exhaust gases is accomplished by a venturi 42 formed in each of the exhaust ports above the exhaust valve assemblies. An air line 43 is provided in each of the venturi throats whereby air is drawn into and mixed with the exhaust gases both as they are passing upwardly through the venturis and as they are being redrawn through the venturis back into the combustion chamber. A check valve 44 is provided in each air line to prevent exhaust gases from escaping through the air lines during any portion of the engine cycle when the pressure in the exhaust ports is greater than atmospheric.

It is understood that the air could be supplied at different locations in the exhaust ports (although the preferred point of introduction is close to the exhaust valve at least in that part through which exhaust products are redrawn) and that it can be introduced by other means such as an air pump rather than a venturi.

It is preferable to vary the amount of air introduced with engine temperature and load since the "richness" of the mixture varies with these parameters. In FIG. 1, the quantity of air introduced into the exhaust gases is controlled by two butterfly-type valves 45 and 46 in each of the air lines. The opening of valves 45 is controlled by engine temperature through bimetallic choke springs 47. Since an engine runs rich on cold startup, the bimetallic choke springs will open valves 45 fully when the engine is cold to supply additional air and will close partially as the engine temperature increases.

The opening of butterfly-type valves 46 is controlled by accelerator position to be fully open when the engine is running at minimum load since a relatively rich mixture is normally supplied for idling and a maximum amount of EG/A mixture is desired and a minimum amount of min NO F/A mixture is required at that operating condition. When the engine is running at full load no exhaust gases will be drawn back into the combustion chamber and valves 46 will be adjusted to let that amount of air enter the exhaust ports which will give the best balance between cooling due to the air and increased oxygen to give minimum emissions. The variation of the opening of valves 46 with load will also be adjusted to produce minimum emissions at all loads.

OPERATION

As shown in FIG. 3, the timing of the main intake valve 28 is conventional for all engine loads—the valve being open during the entire intake stroke. FIGS. 4, 5 and 6 illustrate the variable timing of the auxiliary intake timing valve 29 associated in series with the main intake valve to permit shortening the duration that the intake port is open.

As illustrated in FIG. 7, the two main exhaust valves 36 and 37 are open not only during the entire exhaust stroke but are also open during the entire intake stroke. FIGS. 8–14 show that the auxiliary exhaust timing valves 38 and 39 associated in series with main exhaust valve 36 and 37 respectively are timed so as to permit variable opening of the exhaust ports during the intake stroke for making the proper selection of exhaust gases for stratification with the min NO F/A mixture at partial engine loads.

The timing of the auxiliary timing valves 29, 38 and 39 shown in the drawings is such that the EG/A mixture constituent of the stratified charge is disposed adjacent the exhaust ports and the min NO F/A mixture constituent adjacent the piston. This disposition of the charge constituents is important particularly in a cylinder with a single exhaust gas chamber wherein only the primary selection is made since it permits that portion of the exhaust gases formed by the burning of the EG/A mixture constituent to be exhausted into the exhaust gas chamber ahead of that portion of the exhaust gases formed by the combustion of the min NO F/A mixture constituent. This latter portion of the exhaust gases, some or all of which may be redrawn depending on the engine load, is higher in pollutant content than the first portion of the exhaust gases which is formed from recycled products of a previous charge. The disposition of the charge constituents may be reversed in the twin exhaust port cylinder shown in FIG. 1 if the valve timing shown on the drawings is modified.

The variable timing of the auxiliary valves 29, 38 and 39 can be accomplished by variable timing control mechanisms known in the internal combustion engine art.

FULL LOAD OPERATION

For full load operation it is desired to have a full charge of min NO F/A mixture in the cylinder to provide maximum power. Accordingly, as shown in FIGS. 3 and 4, the main intake valve 28 and its associated intake timing valve 29 operate synchronously and are open to drawn in a full charge of min NO F/A mixture. As shown in FIGS. 7 and 8, the main exhaust valves 36 and 37 are open during the entire intake and exhaust strokes, however, the exhaust ports are closed during the entire intake stroke by the auxiliary exhaust timing valves 38 and 39 so that no EG/A mixture is drawn in for full load operation.

PARTIAL LOAD OPERATION

For partial load operation, it is desired to provide a stratified charge of min NO F/A mixture and EG/A mixture in the combustion chamber. In order to more readily understand partial load operation, let successive engine cycles be designated 1, 2 and 3. Thus, $(EG/A \text{ mixture})_1$ will be the exhaust gases (with air added) formed by combustion of $(min NO F/A \text{ mixture})_1$ in cycle 1. At partial engine load, in cycle 2, before combustion, the cylinder will have a stratified charge consisting of $(EG/A \text{ mixture})_1$ and $(min NO F/A \text{ mixture})_2$ while after combustion it will have constituents $(EG/A \text{ mixture})_1$ and $(EG)_2$, the latter having been formed from the burning of $(min NO F/A \text{ mixture})_2$. $(EG/A \text{ mixture})_1$ having been heated by compression during cycle 2 with consequent reduction in its hydrocarbon and CO content, must then be permanently exhausted while $(EG/A \text{ mixture})_2$ is redrawn for recompression during cycle 3. Therefore, at partial engine load, in cycle 3, before combustion, the cylinder will contain a stratified charge of $(EG/A \text{ mixture})_2$ and $(min NO F/A \text{ mixture})_3$.

If this method of recycling selected exhaust gases is not followed, that is, if $(EG/A \text{ mixture})_1$ rather than $(EG/A \text{ mixture})_2$ was again redrawn for cycle 3, little or no reduction in emissions would be achieved since the same EG/A mixture would be recompressed cycle after cycle.

As shown in FIGS. 6, 9 and 10, under relatively light engine load conditions where all of the exhaust gases formed from the burning of the min NO F/A mixture constituent of a previous charge can be redrawn, the first auxiliary exhaust timing valve 38 is open during the initial portion of the exhaust stroke for exhausting the recompressed $(EG/A \text{ mixture})_1$ into exhaust chamber 40 and thence into the atmosphere. The second auxiliary exhaust timing valve 39 is opened during the latter portion of the exhaust stroke when valve 38 is closed for exhausting the exhaust gases, $(EG)_2$, formed from the burning of $(min NO F/A \text{ mixture})_2$ into exhaust chamber 41. Both auxiliary exhaust timing valves 38 and 39 are closed during the initial portion of the intake stroke while the auxiliary intake timing valve 29 is opened as shown in FIG. 6 for drawing in the required amount of $(min NO F/A \text{ mixture})_3$. Auxiliary exhaust timing valve 39 is opened during the second portion of the intake stroke for redrawing the exhaust gases, $(EG)_2$ (with air added) from exhaust chamber 41 to provide $(EG/A \text{ mixture})_2$ for cycle 3. If the engine load is sufficiently light, some of the $(EG)_1$ might also be exhausted into chamber 41 and redrawn for cycle 3.

It should be understood that if it is only necessary to perform the primary selection (selecting for redrawing that portion of the exhaust gases which was formed by the burning of the fuel/air mixture constituent of a previous stratified charge) to achieve an acceptable emission rate, only one exhaust port need be provided. Under this arrangement, the exhaust gases would be exhausted into a single exhaust chamber, and then all (or as much as possible under the particular load condition) of that portion of the products of combustion which was formed by the burning of the fuel/air mixture constituent of a previous stratified charge would be redrawn while that portion of the products of combustion which was formed from the recompression of exhaust gases from a previous cycle would be finally exhausted. If the engine load is sufficiently light, some of this latter portion of the exhaust gases might also be recycled.

While at relatively light engine loads, all of the exhaust gases formed from the combustion of the min NO F/A mixture constituent of a previous stratified charge can be recycled as well as possibly some of the exhaust gases from the recompression of the EG/A mixture constituent, as engine load is increased, not all of those exhaust gases can be recycled. In fact, at full load operation, very little, if any, exhaust gas is recycled.

When all of the exhaust gases formed from the combustion of the min NO F/A mixture constituent of a previous cycle cannot be recycled, a secondary selection is made to redraw that portion of the total exhaust gases formed by the combustion of the min NO F/A mixture constituent of a previous charge which is highest in the pollutant, CO or hydrocarbons, that it is most desired to minimize. For example, under load conditions where all of the exhaust gases formed from the burning of $(min NO F/A \text{ mixture})_1$ cannot be redrawn for cycle 2, and it is desired to minimize CO emissions, as much as possible of the bulk gas portion of the exhaust gases formed from the burning of the $(min NO F/A \text{ mixture})_1$ constituent of the charge would be redrawn for cycle 2. This may be accomplished by the valve timing shown in FIGS. 3, 5, 7, 11 and 12. As shown in FIGS. 3 and 5, the main intake valve 28 is open during the entire intake stroke and the auxiliary intake timing valve 29 is open for an initial portion of the intake stroke to provide the desired amount of $(min NO F/A \text{ mixture})_2$ in the cylinder. The duration of opening of the auxiliary intake timing valve 29 and, thus, the quantity of $(min NO F/A \text{ mixture})_2$ taken in is varied in proportion to the engine load desired. The auxiliary intake timing valve 29 is then closed, cutting off the intake of $(min NO F/A \text{ mixture})_2$.

As shown in FIG. 7, the main exhaust valves 36 and 37 are open during the entire exhaust and intake strokes. As shown in FIG. 11, the auxiliary exhaust timing valve 38 is open during the initial portion of the exhaust stroke for exhausting the recompressed $(EG/A \text{ mixture})_1$ and again during the last portion of the exhaust stroke for exhausting the quench gas portion of the exhaust gases formed from the burning of the $(min NO F/A \text{ mixture})_1$ constituent of the charge into the exhaust chamber 40. As shown in FIG. 12, the auxiliary exhaust timing valve 39 is closed during the initial and last portions of the exhaust stroke while valve 38 is open, but open during an intermediate portion of the exhaust stroke for exhausting the bulk gas portion of the exhaust gases formed from the burning of the $(min NO F/A \text{ mixture})_1$ constituent of the charge into exhaust chamber 41. Auxiliary exhaust timing valve 39 having been closed during the last portion of the exhaust stroke and the first portion of the intake stroke is then opened during the last portion of the intake stroke to redraw the bulk gases (with air added), from exhaust chamber 41, in an amount to complement the quantity of $(min NO F/A \text{ mixture})_2$ which was drawn into the cylinder during the initial portion of the intake stroke while auxiliary intake timing valve 29 was open.

Under engine load conditions where all of the exhaust gases formed from the burning of $(min NO F/A \text{ mixture})_2$ cannot be redrawn for cycle 2 and it is desired to minimize hydrocarbon emissions, as much as possible of the quench gas portion of the exhaust gases formed from the burning of the $(min NO F/A \text{ mixture})_1$ constituent of the charge would be redrawn for cycle 2. This may be accomplished by the valve timing shown in FIGS. 3, 5, 7, 13 and 14. The intake of the $(min NO F/A \text{ mixture})_2$ constituent of the charge is the same as previously discussed in connection with FIGS. 3 and 5. As shown in FIG. 13, auxiliary exhaust timing valve 38 is open during the initial portion of the exhaust stroke for first exhausting the recompressed $(EG/A \text{ mixture})_1$ followed by the bulk gas portion of the exhaust gases formed from the burning of the $(min NO F/A \text{ mixture})_1$ constituent of the charge into the exhaust chamber 40, and thence into the atmosphere. As shown in the timing diagram of FIG. 14, the auxiliary exhaust timing valve 39 is closed during the initial portion of the exhaust stroke while valve 38 is open, and then opened during the last portion of the exhaust stroke for exhausting the quench gas portion of the exhaust gases formed from the burning of the $(min NO F/A \text{ mixture})_1$ constituent of the charge into exhaust chamber 41. Auxiliary exhaust timing valve 39 having been closed during the first portion of the exhaust stroke and the first portion of the intake stroke is then opened during the last portion of the intake stroke to redraw the quench gases (with air added) previously exhausted, in an amount to complement the quantity of (min NO F/A mixture)$_2$ which was drawn into the cylinder during the initial portion of the intake stroke while auxiliary intake timing valve 29 was open.

DECELERATION AND IDLE OPERATION

During engine deceleration it is desirable to control the auxiliary intake timing valve 29 with a governor (not shown) or the like to completely cut off the intake of min NO F/A mixture to minimize fuel utilization and exhaust emissions. Of course, as engine idle speed is approached on deceleration, the intake timing valve would again be operated to provide sufficient min NO F/A mixture to keep the engine idling. For engine idling it is desired to provide a stratified charge comprising a maximum amount of EG/A mixture and just enough min NO F/A mixture to keep the engine running.

It is also understood that our invention is not limited to spark ignition engines or to engines utilizing carburetors to form the min NO F/A mixture. The invention is equally applicable to diesel engines and to other engines with fuel injection systems. In these cases the intake valves would control the admission of air only and the fuel would be injected into the air to form the min NO F/A mixture constituent of the charge.

It is recognized that our invention is applicable to rotary piston engines as well as reciprocal piston engines. In rotary piston engines during partial load operation, the products of combustion formed by the burning of the min NO F/A mixture constituent of a charge from a previous cycle are exhausted at a first end of the piston and at least a portion thereof is redrawn at the opposite end of the piston with air mixed therewith if desired, to form a stratified charge with min NO F/A mixture drawn in at the first end. As with the previously discussed reciprocal piston engines, the amount of EG/A mixture provided in the combustion chamber of the rotary engine is varied in inverse proportion to engine load so as to always complement the amount of min NO F/A mixture which is varied in proportion to the engine load.

It is understood that our invention is not confined to the particular method or apparatus herein illustrated and described for exemplification, but embraces all such forms thereof as may come within the scope of the following claims.

We claim:

1. In internal combustion engines utilizing the energy released from the combustion of a mixture of fuel and air in a combustion chamber an improvement for providing a stratified charge for improving fuel utilization and reducing objectionable exhaust emissions at partial engine loads, said improvement comprising:
    a. means for providing in the combustion chamber a quantity of fuel/air mixture in proportion to the engine load desired,
    b. means for providing in the combustion chamber a quantity of exhaust gas formed from the burning of a previous fuel/air mixture in said engine in inverse proportion to the engine load desired to complement the quantity of fuel/air mixture to provide a stratified charge in the combustion chamber,
    c. first and second exhaust gas chambers,
    d. means for exhausting into said first exhaust gas chamber the bulk gas portion of the exhaust gases formed from the burning of the fuel/air mixture constituent of said stratified charge and for exhausting into said second exhaust gas chamber the quench gas portion of the exhaust gases formed from the burning of the fuel air mixture constituent of said stratified charge, and
    e. means for redrawing from none to substantially all of said bulk gas portion and quench gas portion from said exhaust gas chambers to form the exhaust gas constituent for a subsequent stratified charge in the engine.

2. In internal combustion engines utilizing the energy released from the combustion of a mixture of fuel and air in a combustion chamber and having a pair of exhaust gas chambers, the method of providing stratified charges for improving fuel utilization and reducing objectionable exhaust emissions at partial engine loads comprising the steps of:
    a. providing in the combustion chamber a quantity of fuel/air mixture in proportion to the engine load desired,
    b. providing in the combustion chamber a quantity of exhaust gas formed from the burning of a previous fuel/air mixture in said engine in inverse proportion to the engine load desired to complement the quantity of fuel/air mixture to provide a stratified charge in the combustion chamber,
    c. exhausting into one of said exhaust gas chambers the bulk gas portion of the exhaust gases formed from the burning of the fuel/air mixture constituent of said stratified charge,
    d. exhausting into the second of said exhaust gas chambers the quench gas portion of the exhaust gases formed from the burning of the fuel/air mixture constituent of said stratified charge, and,
    e. redrawing from none to substantially all of each of said bulk gas portion and quench gas portion from said exhaust gas chambers to form the exhaust gas constituent for a subsequent stratified charge in the engine.

* * * * *